(12) United States Patent
Ando et al.

(10) Patent No.: US 6,244,368 B1
(45) Date of Patent: Jun. 12, 2001

(54) HYBRID POWERED VEHICLE

(75) Inventors: Koji Ando; Kaoru Sawase, both of Anjo; Yuichi Ushiroda, Okazaki, all of (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/496,804

(22) Filed: Feb. 2, 2000

(30) Foreign Application Priority Data

Feb. 3, 1999 (JP) .................................................. 11-026451

(51) Int. Cl.⁷ ....................................................... B60K 1/00
(52) U.S. Cl. ....................... 180/65.2; 180/65.3; 180/65.8; 477/2
(58) Field of Search ................................. 180/65.1, 65.2, 180/65.3, 65.4, 65.5, 65.6, 65.8, 165; 477/2, 3; 701/84, 87, 89

(56) References Cited

U.S. PATENT DOCUMENTS

| 6,028,733 | * | 8/2000 | Ibaraki et al. | 180/65.2 |
| 6,098,735 | * | 8/2000 | Sadarangami et al. | 180/65.2 |
| 6,115,663 | * | 9/2000 | Yasuda | 708/89 |
| 6,122,587 | * | 9/2000 | Takahara et al. | 180/65.4 |
| 6,123,163 | * | 9/2000 | Otsu et al. | 180/65.8 |
| 6,131,680 | * | 10/2000 | Nii et al. | 180/65.2 |
| 6,134,498 | * | 10/2000 | Oba | 701/84 |

* cited by examiner

Primary Examiner—Richard M. Camby
(74) Attorney, Agent, or Firm—Rossi & Associates

(57) ABSTRACT

A hybrid powered vehicle of the present invention reduces the vibrations caused by changes in torque to thereby achieve excellent driving characteristics. The hybrid powered vehicle has an electric motor, an engine and a vehicle driving power source, which outputs a vehicle driving power from at least one of the engine and the electric motor in a plurality of driving modes including an electric motor single driving mode. A starting clutch capable of varying a torque transmission capacity is provided between the vehicle driving power source and drive wheels, and the torque transmission capacity of the starting clutch is controlled according to an output, which a driver requires from the vehicle driving power source. To start the engine while the vehicle is running in the electric motor single driving mode, a control means increases the output of the electric motor in such a manner that the amount of increase is controlled to be equal to or more than an output required for starting the engine in order to slip the starting clutch.

16 Claims, 6 Drawing Sheets

[DIAGRAM OF SPEED]

FRICTION DIVICES IN LOW DRIVING MODE
AND HIGH DRIVING MODE

|  | SECOND CLUTCH | BREAK (ONE WAY CLUTCH) |
|---|---|---|
| Low |  | ◯ (◯)*1 |
| High | ◯ |  |

*1. ONE WAY CLUTCH IS AUTOMATICALLY LOCKED (BLOCK DIAGRAM OF CONTROL OPERATION)

HYBRID POWERED VEHICLE

BACKGROUND OF THE INVENTION

1. Field of the Invention

The invention relates in general to hybrid powered vehicles including an internal combustion engine and an electric motor.

2. Description of Related Art

Recently, a variety of hybrid powered vehicles provided with an electric motor and/or an engine have been developed to tackle environmental pollution. The method for driving the hybrid powered vehicle is roughly classified into the following three methods. First, drive wheels are driven solely by an output of an electric motor connected to the drive wheels. Secondly, the vehicle is driven solely by an output of the electric motor, and an internal combustion engine connected to a power generator is used for power generation only. Thirdly, the engine and the electric motor are selectively connected to the drive wheels so that the output of the electric motor and the output of the engine can be transmitted to the drive wheels. For example, Japanese Patent Provisional Publication No. 6-17727 discloses the hybrid powered vehicle provided with the electric motor and the engine. When the engine is started by engaging a clutch disposed between the engine and the electric motor while the vehicle is driven solely by the electric motor, the output of the electric motor is increased in order to decrease the transmission of the torque to the drive wheels. This prevents the vehicle from being shocked by the start of the engine, and improves the driving characteristics of the vehicle.

In general, there is a change in the torque of the engine when the engine is started. In the case of the hybrid powered vehicle, the change in the torque is transmitted to the electric motor that drives the engine. In the vehicle disclosed by Japanese Patent Provisional Publication No. 6-17727, an output shaft of the power generator is connected directly to the drive wheels, and thus, the change in the torque is transmitted to a body of the vehicle through a wheel drive system. This may result in the vibrations of the vehicle, giving a driver an unpleasant feeling. Similarly, if the output shaft of the electric motor is connected directly to the wheel drive system and a vehicle driving power source including the electric motor can be set to a plurality of driving modes by changing the engagement state of friction devices, the shock caused by the change in the driving modes is transmitted to the body, resulting in the vibrations of the vehicle. The vibrations are contrary to driver's expectations, and deteriorate the driving characteristics of the vehicle.

SUMMARY OF THE INVENTION

It is therefore an object of the present invention to provide a hybrid powered vehicle, which reduces the vibrations caused by changes in torque and changes in driving modes to thereby achieve excellent driving characteristics.

The above object may be accomplished by controlling a variable torque transmission capacity of a starting clutch provided between a vehicle driving power source and drive wheels according to a required output, and increasing an output of the electric motor by adding the amount of output required for slipping the starting clutch to the amount of increase in the output of the electric motor in order to start the engine while the vehicle is running in an electric motor single driving mode. If the torque is changed at the start of the engine, the slip of the starting clutch absorbs the change in the torque and prevents the transmission of the undesirable vibrations to a body of the vehicle.

In one preferred form of the present invention, the control means detects a slip velocity of the starting clutch, and controls the amount of increase in the output of the electric motor in such a manner as to keep the slip velocity within a predetermined range. This prevents the excessive slip of the starting clutch, and improves the durability thereof.

The above object can also be accomplished by controlling a variable torque transmission capacity of a starting clutch provided between a vehicle driving power source and drive wheels in accordance with a required output, and increasing an output of the electric motor by a control means such that a driving output equal to or more than the required output is outputted from the vehicle driving power source in order to slip the starting clutch when driving modes of the vehicle driving power source are changed. Therefore, the slip of the starting clutch absorbs the shock caused by the change in the driving modes, and this prevents the transmission of the undesirable vibrations to a body of the vehicle.

In one preferred form of the present invention, the control means detects a slip velocity of the starting clutch, and controls the increase in the output of the electric motor in such a manner as to keep the slip velocity within a predetermined range. This prevents the excessive slip of the starting clutch and improves the durability of thereof.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
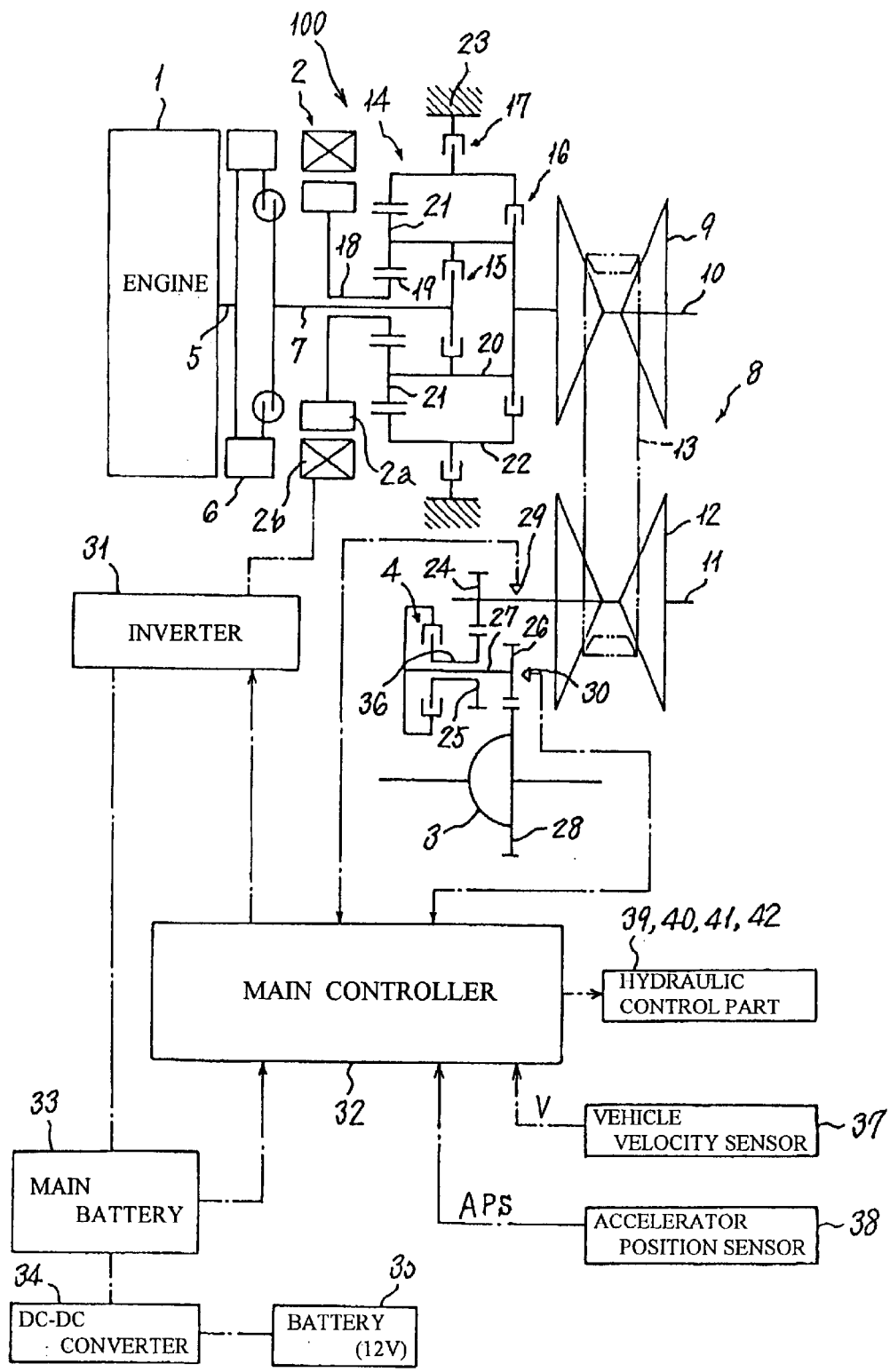
FIG. 1 is a view schematically showing an embodiment of a hybrid powered vehicle according to the present invention.

A vehicle in FIG. 1 has an engine 1, an electric motor 2 and a vehicle driving power source 100, which outputs a vehicle driving power from the engine 1 and/or the electric motor 2 in a plurality of driving modes including an electric motor single driving mode. A starting clutch 4 capable of varying a torque transmission capacity is disposed between the vehicle driving power source 100 and a differential gear 3 at a drive wheel side. The function of the electric motor 2 is switched between a motor and a power generator. It is preferable to use a lean burn engine and a direct injection gasoline engine as the engine 1. The electric motor 2 may function only as a motor, and in this case, a power generator should be provided separately.

A main shaft 7 connects to an end of a crank shaft 5 of the engine 1 through a flywheel 6 with a damper. An input shaft 10 is arranged coaxially with the main shaft 7, and supports a drive pulley 9 of a transmission in the form of a continuously variable transmission (hereinafter referred to as "CVT"). A metal belt 13 is wound on the drive pulley 9 and a driven pulley 12, which is supported on an output shaft 11 arranged in parallel to the input shaft 10. A rotor 2a provided inside the electric motor 2 connects to a hollow output shaft 18 of the electric motor 2. The main shaft 7 is rotatably supported in the output shaft 18.

A driving mode changing part 14 is arranged between the main shaft 7 and the output shaft 18 and the input shaft 10. The driving mode changing part 14 is provided with a planetary gear mechanism and a first clutch 15, a second clutch 16 and a brake element 17 as friction devices.

The planetary gear mechanism is provided with a sun gear 19 attached to the output shaft 18, a plurality of pinion gears 21 rotatably supported on a carrier 20 and engaged with the sun gear 19, and a ring gear 22 arranged outside the pinion gears 21 and engaged with the pinion gears 21. The carrier 20 is connected directly with the input shaft 10.

The first clutch 15 is provided between the main shaft 7 and the carrier 20, and the control of a hydraulic control part 39 causes the first clutch 15 to connect and disconnect the main shaft 7 and the carrier 20. The second clutch 16 is provided between the carrier 20 and the ring gear 22, and the control of a hydraulic control part 40 causes the second clutch 16 to connect and disconnect the carrier 20 and the ring gear 22. The brake element 17 is provided between the ring gear 22 and a casing 23 as a fixing part provided at the outer circumference of the ring gear 22, and the control of a hydraulic control part 42 causes the brake element 17 to connect and disconnect the ring gear 22 and the casing 23. The first clutch 15, the second clutch 16 and the brake element 17 are respectively a well-known hydraulic clutch or brake, but they should not be restricted to the hydraulic clutch or brake so far as their engagement state (transmission torque) can be varied by controlling from the outside.

A gear 24 is fixed on the output shaft 11, and is engaged with a gear 25 provided in a sleeve 36 of an input member for the starting clutch 4. A starting clutch shaft 27 as an output shaft of the starting clutch 4 is inserted into the sleeve 36. The starting clutch shaft 27 is rotatably supported in the sleeve 36. The starting clutch shaft 27 has an output gear 26 engaged with a ring gear 28 of the differential gear 3.

The starting clutch 4 is a well-known hydraulic clutch, which connects and disconnects the sleeve 36 and the starting clutch shaft 27. The control of a hydraulic control part 41 varies the torque transmission capacity between the sleeve 36 and the starting clutch shaft 27.

Rotary sensors 29, 30 as rotating speed sensing means are arranged at the upstream side and the downstream side of the starting clutch 4. The rotary sensor 29 is closer to the vehicle driving power source 100 than the starting clutch 4, whereas the rotary sensor 30 is closer to the differential gear 3 than the starting clutch 4. The rotary sensor 29 senses the rotating speed of the support shaft 11, and the rotary sensor 30 senses the rotating speed of the starting clutch shaft 27.

A coil part 2b of the electric motor 2 connects to a high-voltage main battery 33 through an inverter 31. The main battery 33 connects to a battery 35, which is used as a general power source for lights and meters of the vehicle, through a DC—DC converter 34. The inverter 31 converts a direct current of the main battery 33 into a direct current when the electric motor 2 is used as the motor, and converts an alternating current received from the power generator into a direct current when the electric motor 2 functions as the power generator. The main battery 33 is mainly used as a power source when the electric motor 2 functions as the motor.

The inverter 31 and the main battery 33 connect to a main controller 32 serving as control means. The main controller 32 consists principally of a well-known microcomputer, and has a function of switching internal circuits of the inverter 31 to switch the function of the electric motor 2 between the motor and the power generator and changing the amount of power generated by the electric motor 2 and the amount of the driving force outputted from the electric motor 2.

The main controller 32 connects to the rotary sensors 29, 30; the hydraulic control parts 39, 40, 41, 42; a vehicle velocity sensor 37 for outputting vehicle velocity information V and an accelerator position sensor 38 for outputting accelerator position sensor information APS. A required output detecting means for detecting the output, which a driver requires from the vehicle driving power source, is composed of the vehicle velocity sensor 37 and the accelerator position sensor 38.

In this embodiment, the vehicle has the electric motor single driving mode for running solely by the output of the electric motor 2 functioning as the motor, a hybrid mode for running by the output of the engine 1 as well as the output of the electric motor 2, an engine driving mode for running solely by the output of the engine 1, and a high driving mode and a low driving mode for changing the output of the electric motor 2 in the electric motor single driving mode. The mode is selected according to a driving load of the vehicle.

Figures 2, 3:
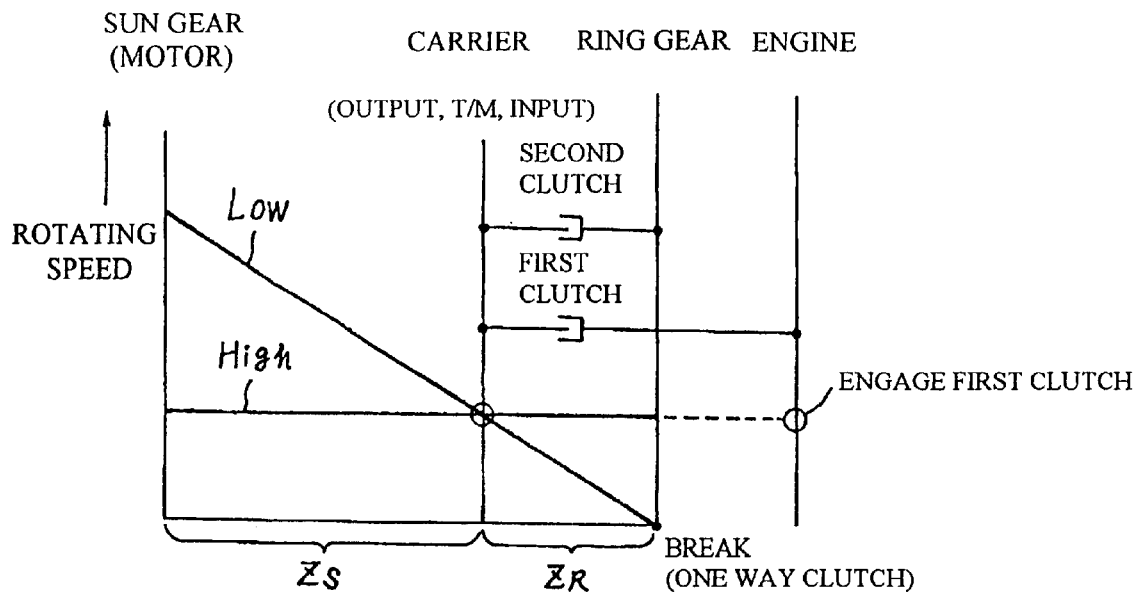
FIG. 2 is a view showing a relationship between a rotating speed of an electric motor 2 and friction devices.
FIG. 3 is a view showing a relationship between driving modes and friction devices.

A description will now be given of a relationship between the driving modes and the engagement and disengagement of the first clutch 15, the second clutch 16 and the brake element 17 with reference to FIGS. 2 and 3. In FIG. 2, a vertical axis represents a motor rotating speed when the electric motor 2 function as the motor, and a horizontal axis represents a rotating speed ratio determined by the number of cogs in the gear. FIG. 3 shows a relationship between the friction devices in the high driving mode and the low driving mode. In FIG. 3, a mark indicates that the friction device is engaged.

For example, the first clutch 15 is engaged in order to start the engine 1 while the vehicle is running. When the vehicle starts running, the low driving mode is selected and the brake element 17 is engaged. When the vehicle runs normally; the high driving mode is selected, the ring gear 22 locked by the brake element 17 is released, and the second clutch 16 is engaged.

Figure 4:
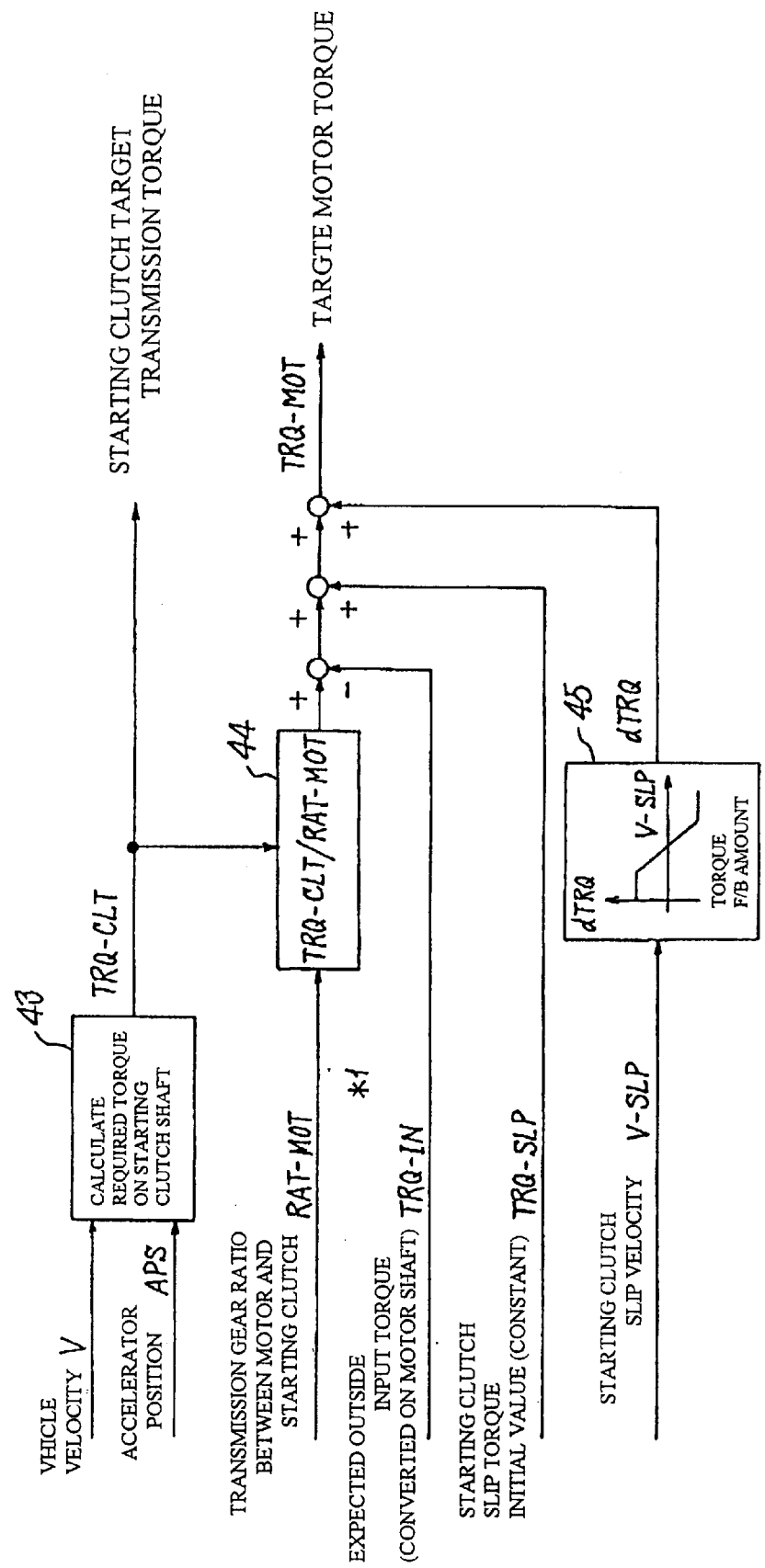
FIG. 4 is a block diagram showing how a control means controls a starting clutch.

As shown in FIG. 4, the main controller 32 has a memory (not illustrated) that contains a required output calculating part 43 for calculating a required torque (TRZ-CLT), which the driver requires from the vehicle driving power source 100, in accordance with the vehicle velocity information V and the accelerator position sensor information APS; a driving required torque calculating part 44 for calculating a driving required torque from the required torque (TRQ-CLT) and a transmission gear ratio of the CVT 8 (RAT-MOT); and a feedback control part 45 for feedback-controlling a slip velocity (V-SLP) at the upstream side and the downstream side of the starting clutch 4 calculated from the rotating speed information outputted from the rotary sensors 29, 30 and outputting a feedback torque (d-TRQ). The main controller 32 has a means for detecting or estimating an outside input torque (TRQ-IN). This means serves as a clutch engagement state detecting means for detecting and estimating the engagement state of the clutches and the brake element.

The outside input torque (TRQ-IN) varies according to the engagement state (transmission torque) of the clutches and the brake element. When the engine is started, the outside input torque (TRQ-IN) is the maximum value of an engine start torque required for starting the engine 1. When the low mode is switched to the high mode, the outside input torque (TRQ-IN) is equivalent to a transmission torque of the second clutch 18. If the drive source is switched from the electric motor 2 to the engine 1, the outside input torque (TRQ-IN) is equivalent to a transmission torque of the first clutch 15. Therefore, the outside input torque (TRQ-IN) is calculated according to the driving mode selected on the basis of the engagement state detected or estimated result.

A description will be given of how the starting clutch 2 is controlled in the hybrid powered vehicle that is constructed in the above-mentioned manner when the low driving mode is switched to the high driving mode.

(How the starting clutch is controlled when the engine is started)

The required output calculating part 43 calculates the required torque (TRQ-CLT) from the vehicle velocity information V and the accelerator position sensor information APS. The torque transmission capacity of the starting clutch 4 is set by controlling the hydraulic control part 41 in such a manner as to achieve a target transmission torque of the starting clutch according to the required torque (TRQ-CLT) so that only the required torque (TRQ-CLT) can be transmitted to the differential gear 3.

Then, the driving required torque calculating part 44 calculates the driving required torque from the required torque (TRQ-CLT) and the transmission gear ratio (RAT-MOT). The electric motor 2 outputs a target motor torque (TRQ-MOT) which is found by adding a starting clutch slip torque (TRQ-SLP) to the calculated driving required torque to slip the starting clutch 4. When the starting clutch 4 starts slipping, the outside input torque (TRQ-IN) that varies according to the engagement state (transmission torque) of the clutches 15, 16 and the brake element 17 is added, and the slip velocity (V-SLP) is calculated on the basis of the rotational information from the rotary sensors 29, 30, in other words, the difference in the rotations between the upstream side and the downstream side of the starting clutch 4. The feedback control part 45 feedback-controls the slip velocity (V-SLP), and adds the feedback torque (d-TRQ) to find the target motor torque (TRQ-MOT) again. The electric motor 2 is controlled as described above so as to slip this target motor torque (TRQ-MOT). Then, the hydraulic control part 39 is driven to engage the first clutch 15 to start the engine.

Figure 5:
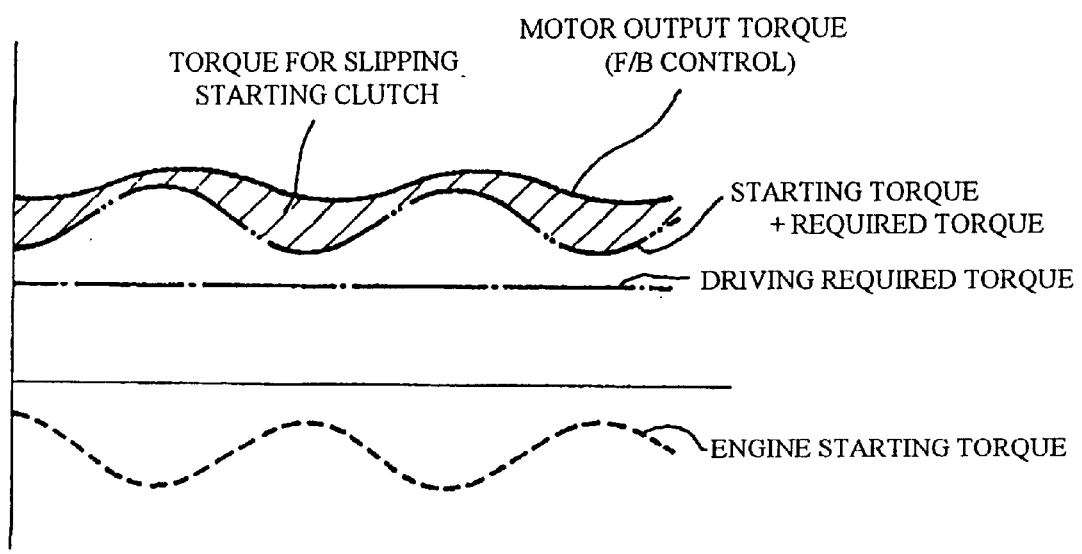
FIG. 5 is a view showing the characteristics of a driving output from an electric motor when an engine is started.

More specifically, the target motor torque (TRQ-MOT) of the electric motor 2 is obtained by adding the engine starting torque indicated by broken lines to the driving required torque indicated by long and short alternate lines as shown in FIG. 5. For this reason, the engagement of the first clutch 15 would not result in the decrease in the torque transmitted to the CVT 8. Therefore, the engine 1 is started without fail, and the torque required for driving the vehicle is secured. The starting clutch slip torque (TRQ-SLP) is also added, and thus, the sleeve 36 of the starting clutch 4 rotates at a faster speed than the starting clutch shaft 27 to thereby slip the starting clutch 4 at the upstream. The slip of the starting clutch 4 absorbs the change in the torque, which occurs at the start of the engine 1. This reduces the vibrations caused by the change in the torque and improves the drive characteristics or driveability of the vehicle. If the slip velocity (V-SLP) of the starting clutch 4 is too high, the feedback control part 45 outputs the feedback torque (d-TRQ) in such a manner as to decrease the slip speed (V-SLP). If the slip velocity (V-SLP) is too low, the feedback control part 45 outputs the feedback torque (d-TRQ) in such a manner as to increase the slip velocity (V-SLP). This keeps the slip velocity (V-SLP) within a predetermined range, and prevents the excessive slip of the starting clutch 4, thus improving the durability thereof.

(The control when the low driving mode is switched to the high driving mode)

Figure 6:
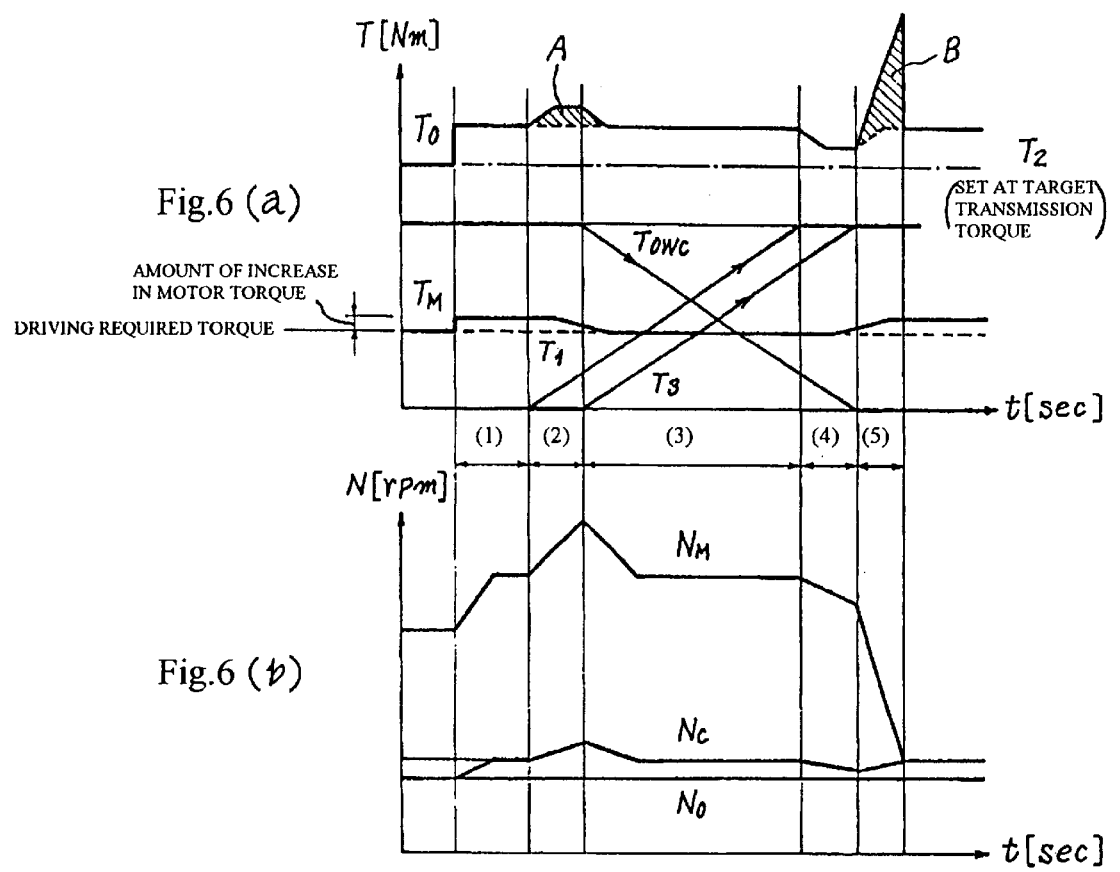
FIG. 6(*a*) is a view showing changes in torque of each part when driving modes are changed, and FIG. 6(*b*) is a view showing changes in rotating speed of each part when driving modes are changed.

Referring next to FIGS. 6(*a*) and 6(*b*), there will be explained the control when the low driving mode is switched to the high driving mode. In FIG. 6(*a*), the vertical axis represents a torque T, and the horizontal axis represents a time t. In FIG. 6(*b*), the vertical axis represents a rotating speed, and the horizontal axis represents a time t.

In a section (1) in FIG. 6 before the operation of the first clutch 15, the second clutch 16 and the brake element 17; the hydraulic control part 41 is controlled to set the torque transmission capacity of the starting clutch 4 in such a manner as to achieve a starting clutch target transmission torque corresponding to the required torque (TRQ-CLT) calculated from the vehicle velocity information V and the accelerator position sensor information APS, so that only the required torque (TRQ-CLT) can be transmitted to the differential gear 3. Then, the driving required torque is calculated from the required torque (TRQ-CLT) and the transmission gear ratio (RAT-MOT), and the starting clutch slip torque (TRQ-SLP) is added to the calculated driving required torque to obtain the target motor torque (TRQ-MOT), which is outputted from the electric motor 2 to slip the starting clutch 4. When the starting clutch 4 starts slipping, the outside input torque (TRQ-IN) that varies according to the engagement state (transmission torque) of the clutches 15, 16 and the brake element 17 is added to the target motor torque (TRQ-MOT), and the slip velocity (V-LSP) of the starting clutch 4 is calculated. Then, the feedback control part 45 feedback-controls the slip velocity (V-SLP), and adds the feedback torque (d-TRQ) to obtain the target motor torque (TRQ-MOT) again. The electric motor 2 is controlled as described above in order to output this target motor torque (TRQ-MOT).

As shown in the section (1) of FIG. 6, a motor torque $T_M$ as the driving output of the electric motor 2 is increased, and an output torque $T_O$ from the carrier 20 to the input shaft 10 is increased to be larger than a clutch torque $T_2$ as the target transmission torque of the starting clutch 4. This slips the starting clutch 4, and the slip velocity (V-SLP) thereof is maintained within a predetermined range.

In sections (2), (3), (4) after the control for slipping the starting clutch 4, the hydraulic control parts 39, 40, 42 are controlled to operate the first clutch 15, the second clutch 16 and the brake element 17. More specifically, the hydraulic control part 39 is controlled to increase a clutch torque $T_1$ in order to engage the first clutch 15 before the operation of the second clutch 16 and the brake element 17. Then, the hydraulic control part 40 is controlled to increase the clutch torque $T_2$ and the clutch torque $T_1$ synchronously with an output torque $T_O$ being maintained at substantially a constant value in order to engage the second clutch 16. At the same time, the hydraulic control part 42 is controlled to decrease a brake torque $T_{OWC}$ in order to release the ring gear 22 locked by the brake element 17. The reason why the first clutch 15 is engaged first is to receive the torque from the engine 1 so as not to decrease the output torque $T_O$ when the second clutch 16 and the brake element 17 are switched. Since the torque from the engine 1 is added to the output torque $T_O$, the output torque $T_O$ is increased as indicated by a diagonal line A in FIG. 6(*a*), and a motor rotating speed $N_M$ and a carrire rotating speed $N_C$ are increased in the section (2) as shown in FIG. 6(*b*). Since the target transmission capacity of the starting clutch 4 is set correspondingly to the required torque (TRQ-CLT), the slip velocity (V-SLP) is increased.

When the second clutch 16 is engaged to cause the brake torque $T_{OWC}$ of the brake element 17 to become 0, the driving mode is completely switched from the low driving mode to the high driving mode. Consequently, the locked state of the ring gear 22 is canceled, and the ring gear 22 and the carrier 20 are integrated. Therefore, the rotating speed $N_M$ is sharply decreased to the rotating speed $N_C$ of the carrier 20 in the section (5) as shown in FIG. 6(*b*). For this reason, an inertia moment of the electric motor 2 sharply increases the output torque $T_O$ as indicated by a diagonal line B in FIG. 6(*a*). In this case, however, the starting clutch 4 slips and absorbs the change in the torque.

As stated above, the shock is produced by the change in the torque when the driving modes are switched, but the shock is absorbed by restricting the transmission torque of the starting clutch 4 within the driving required torque to slip the starting clutch 4. Consequently, the shock is reduced to thereby improve the driveability of the vehicle. Since the slip velocity (V-SLP) is feedback-controlled when the driving modes are switched, the excessive slip of the starting clutch 4 is prevented and this improves the durability thereof.

Figure 7:
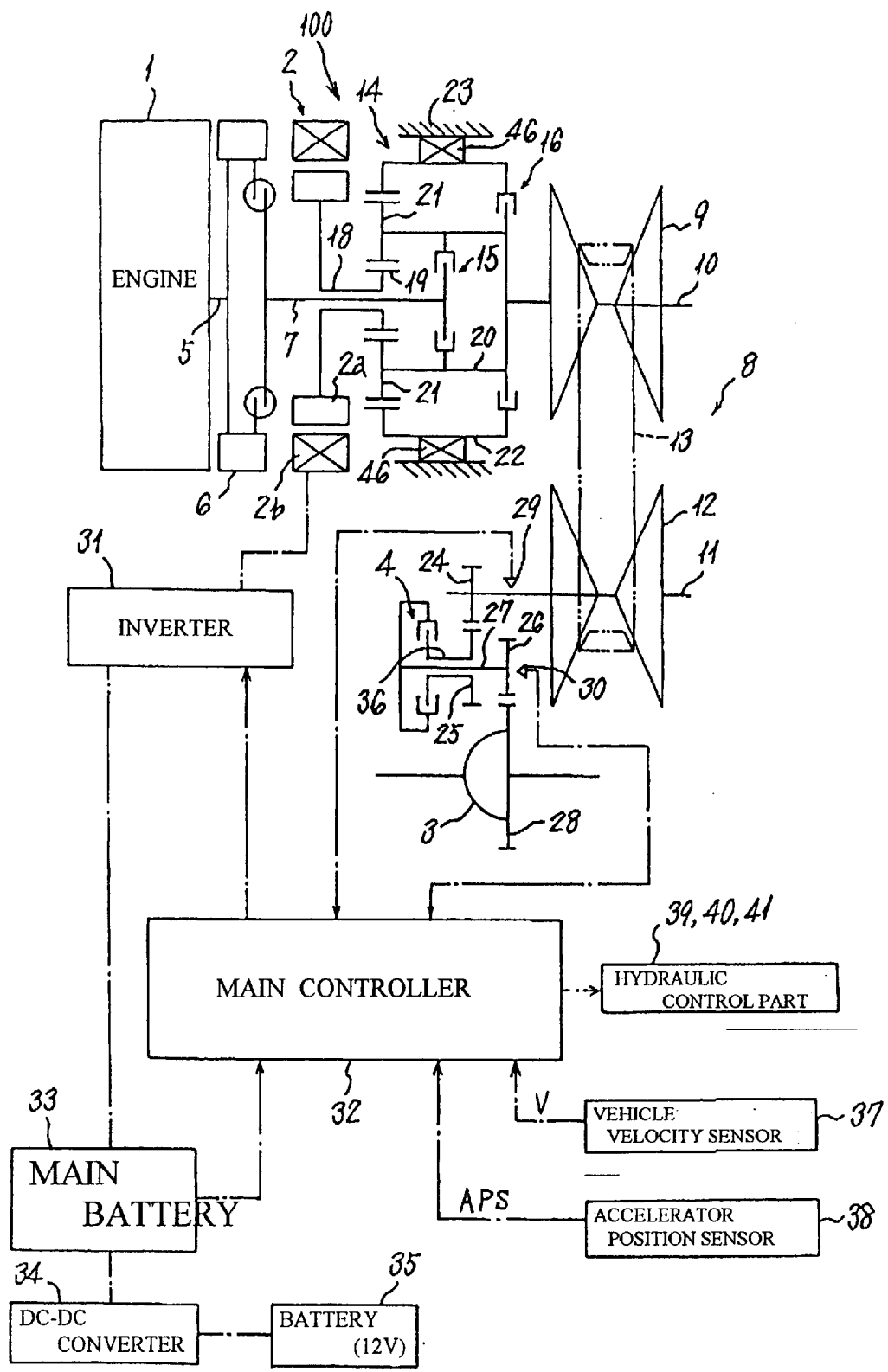
FIG. 7 is a view schematically showing a hybrid powered vehicle with different friction devices.

A hybrid powered vehicle in FIG. 7 is provided with a one way clutch 46 as the friction device instead of the brake element 17, and the one way clutch 46 is disposed between the ring gear 22 and the casing 23. The one way clutch 46 is arranged in such a direction as to prevent the ring gear 22 from rotating in the low driving mode in which the second clutch 16 is unengaged. If vehicle is provided with the one way clutch 46 as mentioned above, the ring gear 22 is automatically locked in the low driving mode. This eliminates the necessity of providing or controlling the hydraulic control part 42 compared with the case where the brake element 17 is used. This simplifies the structure of the vehicle and reduces the costs. Moreover, the shock produced by the change in the torque of the engine and the change in the driving modes is reduced to thereby improve the driveability of the vehicle.

In this embodiment, the CVT 8 is used as the transmission, but a well-known automatic transmission (A/T) with a planetary gear mechanism and a so-called manual transmission (M/T) may also be used. They may be used instead of the CVT 8 on condition that the carrier 20 is connected directly with the input shaft of each transmission and the gear 24 is mounted on the output shaft.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hybrid powered vehicle which has an engine and an electric motor, said vehicle comprising:
   a vehicle driving power source for outputting a vehicle driving power from at least one of said engine and said electric motor in a plurality of driving modes including an electric motor single driving mode;
   a starting clutch capable of varying a torque transmission capacity, said starting clutch being provided between said vehicle driving power source and drive wheels;
   required output detecting means for detecting an output required from said vehicle driving power source;
   control means for controlling a torque transmission capacity of said starting clutch in accordance with said required output, and adding an amount of output required for slipping said starting clutch to an amount of increase in an output of said electric motor when the output of said electric motor is increased at a start of said engine while said vehicle is running in said electric motor single driving mode.

2. The hybrid powered vehicle as defined in claim 1, wherein:
   said control means detects a slip velocity of said starting clutch, and controls the amount of increase in the output of said electric motor in such a manner as to keep said slip velocity within a predetermined range.

3. A hybrid powered vehicle which has an engine and an electric motor, said vehicle comprising:
   a vehicle driving power source for outputting a vehicle driving power from at least one of said engine and said electric motor in a plurality of driving modes including an electric motor single driving mode;
   a starting clutch capable of varying a torque transmission capacity provided between said vehicle driving power source and drive wheels;
   required output detecting means for detecting an output required from said vehicle driving power source;
   control means for controlling a torque transmission capacity of said starting clutch in accordance with said required output, and for increasing an output of said electric motor such that a larger driving output than said required output is outputted from said vehicle driving power source in order to slip said starting clutch when said driving modes of said vehicle driving power source are changed.

4. The hybrid powered vehicle as defined in claim 3, wherein said control means detects a slip velocity of said starting clutch, and controls the increase in the output of said electric motor in such a manner as to keep said slip velocity within a predetermined range.

5. The hybrid powered vehicle as claimed in claim 1, wherein the vehicle driving power source includes a driving mode changing part including a planetary gear mechanism, a first clutch, a second clutch, and a friction element.

6. The hybrid powered vehicle as claimed in claim 5, wherein the planetary gear mechanism includes a sun gear attached to an output shaft of the electric motor, a plurality of pinion gears rotatably supported on a carrier and engaged with the sun gear, and a ring gear arranged outside of and engaged with the pinion gears; wherein the first clutch is provided between a main output shaft, which is coupled to the output of the engine, and the carrier to selectively connect and disconnect the main shaft to the carrier; wherein the second clutch is provided between the carrier and the ring gear to selectively connect and disconnect the carrier and the ring gear; and wherein the friction element is provided between the ring gear and a casing to selectively connect and disconnect the ring gear to the casing.

7. The hybrid powered vehicle as claimed in claim 6, wherein the friction element comprises a brake.

8. The hybrid powered vehicle as claimed in claim 6, wherein the friction element comprises a one way clutch.

9. The hybrid powered vehicle as claimed in claim 5, wherein the vehicle power driving source includes a transmission having an input shaft coupled to a carrier of the planetary gear mechanism and an output shaft coupled to an input member of the starting clutch.

10. The hybrid powered vehicle as claimed in claim 5, wherein the transmission comprises a continuously variable transmission.

11. The hybrid powered vehicle as claimed in claim 3, wherein the vehicle driving power source includes a driving mode changing part including a planetary gear mechanism, a first clutch, a second clutch, and a friction element.

12. The hybrid powered vehicle as claimed in claim 11, wherein the planetary gear mechanism includes a sun gear attached to an output shaft of the electric motor, a plurality of pinion gears rotatably supported on a carrier and engaged with the sun gear, and a ring gear arranged outside of and engaged with the pinion gears; wherein the first clutch is provided between a main output shaft, which is coupled to the output of the engine, and the carrier to selectively connect and disconnect the main shaft to the carrier; wherein the second clutch is provided between the carrier and the ring gear to selectively connect and disconnect the carrier and the ring gear; and wherein the friction element is provided between the ring gear and a casing to selectively connect and disconnect the ring gear to the casing.

13. The hybrid powered vehicle as claimed in claim 12, wherein the friction element comprises a brake.

14. The hybrid powered vehicle as claimed in claim 12, wherein the friction element comprises a one way clutch.

15. The hybrid powered vehicle as claimed in claim 11, wherein the vehicle power driving source includes a transmission having an input shaft coupled to a carrier of the planetary gear mechanism and an output shaft coupled to an input member of the starting clutch.

16. The hybrid powered vehicle as claimed in claim 11, wherein the transmission comprises a continuously variable transmission.

\* \* \* \* \*